United States Patent
Dobre et al.

(10) Patent No.: US 10,055,427 B2
(45) Date of Patent: Aug. 21, 2018

(54) METHOD AND SYSTEM FOR STORING A FILE ON A PLURALITY OF SERVERS

(71) Applicant: NEC Europe Ltd., Heidelberg (DE)

(72) Inventors: Dan Dobre, Munich (DE); Ghassan Karame, Heidelberg (DE)

(73) Assignee: NEC Corporation, Tokyo (JP)

( * ) Notice: Subject to any disclaimer, the term of this patent is extended or adjusted under 35 U.S.C. 154(b) by 597 days.

(21) Appl. No.: 14/419,700

(22) PCT Filed: Oct. 18, 2013

(86) PCT No.: PCT/EP2013/071823
§ 371 (c)(1),
(2) Date: Feb. 5, 2015

(87) PCT Pub. No.: WO2014/060572
PCT Pub. Date: Apr. 24, 2014

(65) Prior Publication Data
US 2015/0220562 A1 Aug. 6, 2015

(30) Foreign Application Priority Data
Oct. 19, 2012 (EP) ................... 12189208

(51) Int. Cl.
G06F 17/30 (2006.01)
G06F 11/10 (2006.01)

(52) U.S. Cl.
CPC .... *G06F 17/30203* (2013.01); *G06F 11/1096* (2013.01)

(58) Field of Classification Search
CPC ............................. G06F 17/30203
See application file for complete search history.

(56) References Cited

U.S. PATENT DOCUMENTS

2011/0072321 A1 3/2011 Dhuse

OTHER PUBLICATIONS

Goodson G R et al: "Efficient byzantine-tolerant erasure-coded storage", Dependable Systems and Networks, 2004 International Conference on Florence, Italy Jun. 28-Jul. 1, 2004, Piscataway, NJ, USA, IEEE, Jun. 28, 2004 (Jun. 28, 20014), pp. 121-130, XP010710795.

Guerraoui R et al: "Lucky Read/Write Access to Robust Atomic Storage", Dependable Systems and Networks, 2006. DSN 2006. International Conference on, Philadelphia, PA, USA, Jun. 25, 2006 (Jun. 25, 2006), pp. 125-136, XP010925229.

*Primary Examiner* — Grace Park
(74) *Attorney, Agent, or Firm* — Leydig, Voit & Mayer, Ltd.

(57) ABSTRACT

Methods and systems for storing a file on a plurality of servers are provided. The number of servers is n and the maximum number of servers which may fail is t. A predefined number b of byzantine failures and a number t−b of crashes of the servers is contemplated, where n equals 2t+b+1. The file is divided into a plurality of chunks, where the number of chunks is equal to or greater than the number of servers. The chunks of the file are sent to the n servers, where at least one chunk is sent to each server. The number of replies r from the n servers indicating successful storage of the respective chunks are determined. The number of replies r matching a terminating condition is checked. A new file based is generated. The process is repeated for the new file.

14 Claims, 2 Drawing Sheets

METHOD AND SYSTEM FOR STORING A FILE ON A PLURALITY OF SERVERS

CROSS-REFERENCE TO PRIOR APPLICATIONS

This application is a U.S. National Stage Application under 35 U.S.C. § 371 of International Application No. PCT/EP2013/071823 filed on Oct. 18, 2013, and claims benefit to European Patent Application No. EP 12189208.7, filed on Oct. 19, 2012. The International Application was published in English on Apr. 24, 2014 as WO 2014/060752 under PCT Article 21(2).

FIELD

The present invention relates to a method for storing a file on a plurality of servers wherein the number of servers is n and the maximum number of servers which might be fail is t, preferably including a predefined number b of byzantine failures and a number t−b of crashes of the servers, and wherein n equals 2t+b+1.

The present invention further relates to a system for storing a file on a plurality of servers, wherein the number of servers is n and the maximum number of servers which might be fail is t, preferably including a predefined number b of byzantine failures and a number t−b of crashes of the servers and wherein n equals 2t+b+1, comprising the plurality of servers and a writer for writing the file onto the servers.

BACKGROUND

In distributed storage systems, for example a RAID system, a file is dispersed on a plurality of servers, in case of a RAID system on a plurality of hard discs. The file is dispersed in such a way that for example in a RAID system when a hard disc fails or more general is simply unavailable, the number of dispersed file fragments on the remaining hard discs is large enough to restore or reconstruct the dispersed file from the file parts stored on the remaining operating hard discs.

Unavailability of entities like servers in distributed computing systems or for example hard discs in a RAID system can be distinguished into byzantine failures and crashes. Byzantine failures are arbitrary faults occurring for example during an execution of an algorithm by the distributed system. When a byzantine failure has occurred the distributed system may respond in an unpredictable way. Byzantine failures may e.g. arise from malware or hackers that attack storage servers or from manufacturer faults.

The other type of failure is a crash leading to unavailability at least temporarily. A crash may also be a intended shutdown of a server, for example for maintenance reasons.

However unavailability of entities in distributed systems occurs only occasionally. Such a worst case scenario would include unpredictable message delays, for example due to a network partition or a swamped server. In most cases the distributed system is functioning: The communication is synchronous and messages are delivered within respected time bounds in the distributed system Further a distributed computing system is conventionally configured to tolerate a large number of server failures although the occurrence of actual failures is rather low.

Conventional storage protocols like byzantine storage protocols described in James Hendricks, Gregory R. Ganger, and Michael K. Reiter. 2007, "Low-overhead byzantine fault-tolerant storage", in Proceedings of twenty-first ACM SIGOPS symposium on Operating systems principles (SOSP '07) proposes handling of worst case scenarios. One of the disadvantages is however that a large overhead communication with respect to the information exchanged is necessary leading to a high blow-up factor A further disadvantage is that the proposed methods therein are inflexible relating only to byzantine failures of servers.

SUMMARY

In an embodiment, the present invention provides a method for storing a first file $\Delta_1$ on a plurality of servers ($S_1, S_2, \ldots, S_n$). The number of servers ($S_1, S_2, \ldots, S_n$) is n and the maximum number of servers ($S_1, S_2, \ldots, S_n$) which may fail is t, including a predefined number b of byzantine failures and a number t−b of crashes of the servers ($S_1, S_2, \ldots, S_n$), and wherein n equals 2t+b+1. The method includes: a) Dividing the first file ($\Delta_1$) into a plurality of chunks ($C_1, C_2, \ldots, C_n$), wherein the number of chunks ($\delta_1$) is equal to or greater than the number of servers n; b) Sending n chunks of the first file ($\Delta_1$) to the n servers ($S_1, S_2, \ldots, S_n$), wherein one chunk is sent to each server ($S_1, S_2, \ldots, S_n$); c) Determining a number of replies r from the n servers ($S_1, S_2, \ldots, S_n$) indicating successful storage of the respective chunks; d) Checking if the number of replies r matches a terminating condition (TC); e) Generating, when the number of replies r does not match a terminating condition, a new file ($\Delta_2$) based on one or more chunks of the first file ($\Delta_1$), a reconstruction threshold ($m_1$) of the first file ($\Delta_1$), and the number of replies r, and f) Performing steps a)-e) with the new file ($\Delta_2$), until the terminating condition in step d) is fulfilled. The terminating condition (TC) is based on the difference between the reconstruction thresholds of the file ($\Delta_1, \Delta_2, \ldots, \Delta_k$) of step e) and the first file of step a) and the maximum number of servers t which may fail.

In another embodiment, a system for storing a first file ($\Delta_1$) on a plurality of servers ($S_1, S_2, \ldots, S_n$) is provided. The number of servers ($S_1, S_2, \ldots, S_n$) is n and the maximum number of servers ($S_1, S_2, \ldots, S_n$) which may fail is t, preferably including a predefined number b of byzantine failures and a number t−b of crashes of the servers ($S_1, S_2, \ldots, S_n$), and wherein n equals 2+b+1. The system comprises one or more processors which, alone or in combination, are configured to provide for execution of a number of steps. The steps include a) Dividing the first file ($\Delta_1$) into a plurality of chunks ($C_1, C_2, \ldots, C_n$), wherein the number of chunks ($\delta_1$) is equal to or greater than the number of servers n; b) Sending n chunks of the first file ($\Delta_1$) to the n servers ($S_1, S_2, \ldots, S_n$), wherein one chunk is sent to each server ($S_1, S_2, \ldots, S_n$); c) Determining a number of replies r from the n servers ($S_1, S_2, \ldots, S_n$) indicating successful storage of the respective chunks; d) Checking if the number of replies r matches a terminating condition (TC); e) Generating, when the number of replies r does not match the terminating condition, a new file ($\Delta_2$) based on one or more chunks of the first file ($\Delta_2$), a reconstruction threshold ($m_1$) of the first file ($\Delta_1$) and the number of replies r, and f) Performing steps a)-e) with the new file ($\Delta_2$), until the terminating condition in step d) is fulfilled. The terminating condition (TC) is based on the difference between the reconstruction thresholds of the new file ($\Delta_1, \Delta_2, \ldots, \Delta_k$) of step e) and the first file of a step a) and the maximum number of servers t which may fail.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
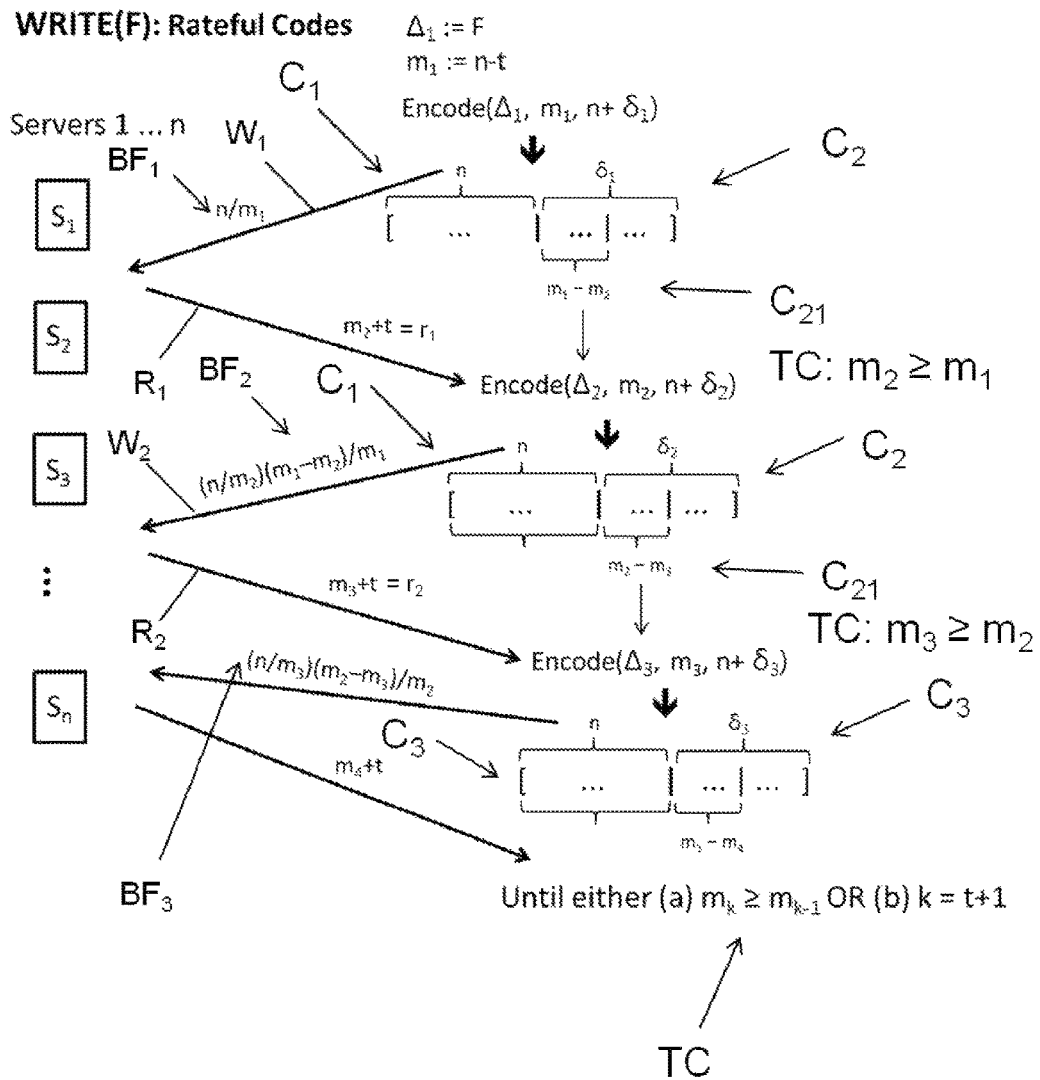
FIG. 1 shows a first embodiment of a method according to the present invention and FIG. 2 shows a second embodiment of a method according to the present invention.

Embodiments of the present invention provide a method and a system for storing a file on a plurality of servers with reduced communication overhead for dispersing the file onto the plurality of servers.

Embodiments of the present invention further provide a method and a system for storing a file on a plurality of servers providing an optimized blow up factor with respect to the amount of information sent.

Embodiments of the present invention even further provide a method and a system for storing a file on a plurality of servers which are more flexible, in particular with regard to failure types and/or error correction codes.

In an embodiment, a method for storing a file on a plurality of servers is defined, wherein the number of servers is n and the maximum number of servers which might be fail is t, preferably including a predefined number b of byzantine failures and a number t−b of crashes of the servers, and wherein n equals 2t+b+1.

According to an embodiment, the method is characterized by the steps of
a) Dividing the file into a plurality of chunks, wherein the number of chunks is equal to or greater than the number of servers n,
b) Sending n chunks of the file to the n servers, wherein one chunk is sent to each server,
c) Determining the number of replies r from the n servers indicating successful storage of the respective chunks,
d) Checking if the number of replies r matches a terminating condition, and if not
e) Generating a new file based on one or more chunks of the old file, a reconstruction threshold of the old file and the number of replies, and
f) Performing steps a)-e) with the new file as file for these steps, until the terminating condition in step d) is fulfilled, wherein the terminating condition is based on the difference between the reconstruction thresholds of the new file of step e) and the old file of step a) and the maximum number of servers which might be fail.

In an embodiment, a system for storing a file on a plurality of servers is defined, wherein the number of servers is n and the maximum number of servers which might be fail is t, preferably including a predefined number b of byzantine failures and a number t−b of crashes of the servers, and wherein n equals 2t+b+1, comprising the plurality of servers and a writer for writing the file onto the servers, preferably for performing with a method according to an embodiment of the invention According to an embodiment, the system is characterized by dividing means, preferably a writer, operable to divide the file into a plurality of chunks, wherein the number of chunks is equal to or greater than the number of servers n, to sending means, preferably the writer, operable to send n chunks of the file to the n servers, wherein one chunk is sent to each server, and determining means, preferably the writer, operable to determine the number of replies r from the n servers indicating successful storage of the respective chunks, checking means, preferably the writer, operable to check whether the number of replies r matches a terminating condition, generating means, preferably the writer, operable to generate a new file based on one or more chunks of the old file, a reconstruction threshold of the old file and the number of replies, and recursive means operable to operate recursively the dividing means, the sending means, the determining means, the checking means and the generation means with the new file as file, until the terminating condition is fulfilled, wherein the terminating condition is based on the difference between the reconstruction thresholds of the new file and the old file and the maximum number of servers which might be fail.

According to the invention it has been recognized that synchrony is exploited to achieve a communication blow-up factor which is optimal. For example the blow-up factor is at most $n/(r-t)$ where r is the number of responsive servers with $n-t \leq r \leq n$ in a synchronous execution. In an asynchronous execution a low bound of $n/(n-2t)$ is achieved. A blow up factor of $n/(r-t)$ is optimal because the file must be recoverable despite a number of failed servers t out of the r responsive servers.

According to the invention it has been further recognized that flexibility is enhanced since generic erasure coding schemes may be used, i.e. the invention is not limited or restricted to a specific type of erasure coding technique. Further both crashed servers and byzantine servers and/or a combination of both may be respected.

In other words synchrony is exploited for providing a method and a system for a distributed storage with an optimal communication and blow-up factor and enables to recursively apply erasure coding on data parameters in particular by the number of received replies as a reconstruction threshold.

According to a preferred embodiment in step a) when a total number of generated chunks is greater than the number of servers, the number of chunks generated in addition to the n chunks is dependent on the number of servers which might fail and a reconstruction threshold for the file. This enables to generate in addition to n so-called main chunks a number of auxiliary chunks. These auxiliary chunks are then preferably constructed in one step together with the main chunks allowing the use of verification techniques for examples to calculate cross check sums accompanying the chunk in a reply. This enables to verify if the corresponding chunk on the server was somehow modified.

According to a further preferred embodiment for the first performing of step a) the reconstruction threshold is based on an estimated number of responsive servers. This enables to provide a number of chunks for the file which are sufficient to reconstruct the file based on the number of responsive servers. For example the estimation may be performed on historic data on availability of a server or any other data indicating responsiveness like communication between a writer and the respective servers or the like.

According to a further preferred embodiment the estimated number is greater than a sum of byzantine servers b and servers t−b that might crash. If the number of responsive servers is r, the number of servers that might be fail is t and the number of byzantine servers is b then the number of responsive servers is represented by $r \geq t+b+1$.

According to a further preferred embodiment the total number of chunks in step a) is 2t+th, wherein t is the maximum of servers that might be fail and th is the reconstruction threshold for the corresponding file. One of the advantages is, that then the total number of chunks may be different in each round of steps a)-f), so that reconstruction of the overall file, i.e. the original file, is ensured.

According to a further preferred embodiment the one or more chunks for generation of the new file are solely based on the one or more of the prior non-sent remaining chunks. This enables to only count the number of responsive servers but not to determine which chunk of the already sent chunks was stored successfully. Thus, efficiency is enhanced.

According to a further preferred embodiment chunks in addition to the generated n chunks are only generated to the extent that the termination condition is not matched. This further leverages efficiency, since—when the number of responsive servers is high—only a few chunks are used for the next round whereas if the number of responsive servers is low then more chunks are generated to ensure consistency for reconstruction. To provide chunks to the extended termination condition is not matched, i.e. to create further chunks on demand, rateless codes such as online codes, described in P. Maymounkov, "Online Codes", Technical Report TR2002-833, Technical report, New York University, 2002, which is incorporated by reference herein, can be used to create them on demand.

According to a further preferred embodiment the generation of the new file is performed by concatenating one or more chunks. This allows in an easy and efficient way to generate a new file.

According to a further preferred embodiment a timeout threshold is used when determining the number of replies according to step c), preferably wherein the timeout threshold starts after a predetermined number of received replies, preferably wherein the predetermined number corresponds to the number of replies needed for reconstruction of the file. When a timeout threshold is used a termination condition for waiting for the number of replies of responsive servers is enabled. This allows to further perform the next step even if a certain number of servers has not replied yet. If preferably the timeout threshold starts after a predetermined number of received replies it is ensured that at least it is waited until a number of replies is received. Preferably this number corresponds to the number of replies needed for reconstruction of the file. In this case it is ensured that the number of replies of responsive servers is high enough to reconstruct the file. Thus resending of the already sent chunks to all servers is not necessary and the next step may be performed.

According to a further preferred embodiment the timeout threshold is dynamically adapted in each round of steps a)-e), preferably wherein the adaption is based on connection conditions between a writer of the file and the servers and/or of server conditions. By dynamically adapting the timeout threshold, flexibility in general is enhanced. Further a dynamic adaption of the timeout threshold enables an optimized waiting time for a number of replies of responsive servers in each round. If the adaption is based on information concerning connection conditions or server conditions this may be used for adapting the timeout threshold: For example if a server usually has a low latency time for responding but during one round a load of the server is increasing, then the timeout may be increased in the next steps to ensure that a predefined number of additional replies is received in any case. Preferably latency may be used for determining a timeout threshold by analyzing historic latency times and then taking for example the timeout in such a way that in 95% the servers reply within that time period.

According to a further preferred embodiment adaption information is encoded in the replies from the servers. Therefore a writer may analyze the reply and extract the necessary information for adapting the timeout. Additional data traffic after the reply is avoided.

According to a further preferred embodiment the termination condition is fulfilled if either the reconstruction threshold for file of an actual round with regard to rounds of steps a)-e) is greater than or equal to the reconstruction threshold of the prior round or the number of rounds has exceeded the number of servers that might fail. This enables that in any case after t+1 rounds the original file is stored on the servers in such a way, that it can be reconstructed from the servers even if t servers have failed. If the reconstruction threshold of the actual round is greater than or equal to the reconstruction threshold then the file is stored on enough servers so that it can be correctly reconstructed by readers later on. Then the write operation is completed.

According to a further preferred embodiment the new file is generated based on the first one or more chunks of the prior non-sent remaining chunks. This enables a fast selection of chunks for the new file.

FIG. 1 shows a first embodiment of a method according to the present invention.

In FIG. 1 the storing of a file F using rateful codes is shown.

For storing the file F with rateful erasure coding a writer estimates the number of responsive servers r which is greater than or equal to t+b+1 assuming that n=2t+b+1 servers among which at most b might be byzantine and the rest t−b may crash are provided. Further a set of clients is assumed leveraging them for sharing data via read/write functionality. Neither servers nor clients communicate with each other. Even further asynchronous transfer respectively communication is assumed in which no assumption is made on the time it takes to transmit a message between a client and a server.

After the number of responsive servers r is estimated, the writer computes a reconstruction threshold $m_1$ such that $m_1=r-t$.

Then a sequence of k rounds with the following steps are performed, wherein $1 \leq k \leq t+1$.

The writer encodes the file F into $n'=n+\delta_1=2t+b+1+m_1-(b+1)$ chunks such that $m_1$ of the generated chunks are sufficient to reconstruct the file F. In the following $m_1$ is the reconstruction threshold in the first round k=1. The total number n' of generated chunks $C_1$, $C_2$ is greater or equal than the total number of servers n. Therefore the chunks $C_1$, $C_2$ can be divided into n main chunks $C_1$ and $n'-n=m_1-(b+1)$ auxiliary chunks $C_2$. The blow-up factor $BF_1$ is then $n/m_1$.

The writer then selects the first n chunks $C_1$, i.e. the main chunks $C_1$, and sends them to the servers $S_1, S_2, \ldots, S_n$ one to each server $S_1, S_2, \ldots, S_n$ denoted with reference sign $W_1$ and $W_k$ for round k. Since some of the servers $S_1, S_2, S_3, \ldots, S_n$ may be unresponsive, the writer counts the number of replies r it receives, wherein the replies are indicated with reference sign $R_1$ and $R_k$ for round k.

In order to avoid blocking by failed servers, the writer waits for an expiry of a predetermined time period, preferably after the writer has already received n−t replies from the servers $S_1, S_2, S_3, \ldots, S_n$, wherein receiving of n−t replies is sufficient for reconstruction of the file F.

After receiving the number $r_1$ of replies in the first round k=1 then the reconstruction threshold $m_2$ for the next round k=2 is set to $m_2=r_1-t$. This ensures that when the number of replies received from the servers $S_1, S_2, S_3, \ldots, S_n$ is greater than the estimated number of responsive servers, i.e. $m_2 \geq m_1$, and the file F is stored at enough servers $S_1, S_2, S_3, \ldots, S_n$, so that it can be correctly reconstructed by readers later. In this case the write operation is already completed.

If the number of replies $r_1$ is smaller than the number of estimated replies r from the initial step then additional chunks are needed to be stored into the servers $S_1, S_2, S_3, \ldots, S_n$ for the file F to be recoverable.

These additional chunks are selected by taking the first chunks of the auxiliary chunks $C_{21}$, i.e. the first $m_1-m_2$ chunks among the $m_1-(b+1)$ constructed auxiliary chunks $C_2$. The writer concatenates the first $m_1-m_2$ auxiliary chunks $C_2$ and proceeds to round k=2 with the concatenated chunks forming a new file $\Delta_2$ with smaller size than the original file F.

In round k=2 instead of the file F the generated file $\Delta_2$ consisting of the $m_1-m_2$ concatenated auxiliary chunks $C_2$ is encoded into n'=2 t+$m_2$ chunks so that the file $\Delta_2$ can be reconstructed with $m_2$ chunks, wherein $m_2=r_1-t$. These resulting chunks of the file $\Delta_2$ are smaller than the auxiliary chunks $C_2$ of the preliminary round k=1.

These chunks of smaller side, i.e. the first n chunks of the generated n' chunks in the second round k=2 are then (re)sent to the n servers $S_1, S_2, S_3, \ldots, S_n$ one chunk to each server $S_1, S_2, S_3, \ldots, S_n$. Similarly the writer then counts the number of replies $r_2$ received. The reconstruction threshold for the next round $m_3$ is then set to $m_3=r_2-t$.

After that, it is checked whether $m_3$ is greater than or equal to $m_2$ or $m_3 \geq m_2$ respectively. If this terminating condition TC is fulfilled then F is finally stored on enough servers $S_1, S_2, S_3, \ldots, S_n$, so that it can be correctly reconstructed by readers later. If the terminating condition TC is not fulfilled, i.e. $m_3 < m_2$ then a further round k=3 is performed as long as either the maximum number of iterations k is reached, i.e. k=t+1 or $m_k \geq m_{k-1}$. For example in the worst case $m_1$ is set to t+b+1 and in the second step $m_2$ is set to $m_1-1, \ldots m_k=m_1-k-1$. If k is equal to t+1 then $m_{t+1}=m_1-t=b+1$. Since n-t servers $S_1, S_2, S_3, \ldots, S_n$ are responsive, i.e. n-t replies are provided, the file F can be encoded such that it can be recovered from n-2t=b+1 chunks ensuring its reconstructability.

Therefore in round k the file $\Delta_k$ is encoded into $n'_k=2t+m_k$ chunks so it can be reconstructed with $m_k$ chunks. $n'_k$ is always greater than or equal to n. The first chunks of the resulting chunks are then recent to the n servers $S_1, S_2, S_3, \ldots, S_n$ and the number of replies $r_k$ received is counted and $m_{k+1}$ is then set to $r_k-t$.

The terminating condition TC is fulfilled if $m_{k+1} \geq m_k$: F is then stored at enough servers $S_1, S_2, S_3, \ldots, S_n$, so that it can be correctly reconstructed later. On the other hand if $m_{k+1} < m_k$ then the further round k+1 is performed. The reference sign $\delta 1, \delta 2, \delta 3, \ldots$ indicates the number of auxiliary chunks when dividing the file $\Delta_k$ in the respective round k.

Further in FIG. 1 the corresponding blow-up factors $BF_k$ in the corresponding rounds k are shown. For example in the first round k=1 the blow-up factor $BF_1$ is equal to $n/m_1$, in round k=2 the blow-up factor $BF_2$ is $(n/m_2)(m_1-m_2)/m_1$. Therefore the blow-up factor in round k is $BF_k=n/m_k (m_{k-1}-m_k)/m_{k-1}$. The resulting blow-up factor BF can be computed as the sum of the corresponding blow-up factors during each of the k rounds of the write. In detail it is the sum of the number of bits sent during each rounds of the write over IFI:

$$BF = BF_1 + BF_2 + \ldots$$
$$= n/m_1 + n/m_2 * (m_1 - m_2)/m_1 + n/m_3 * (m_2 - m_3)/m_2 + \ldots + n/m_k * (m_{k-1} - m_k)/m_{k-1}$$
$$= n/m_k$$

Figure 2:
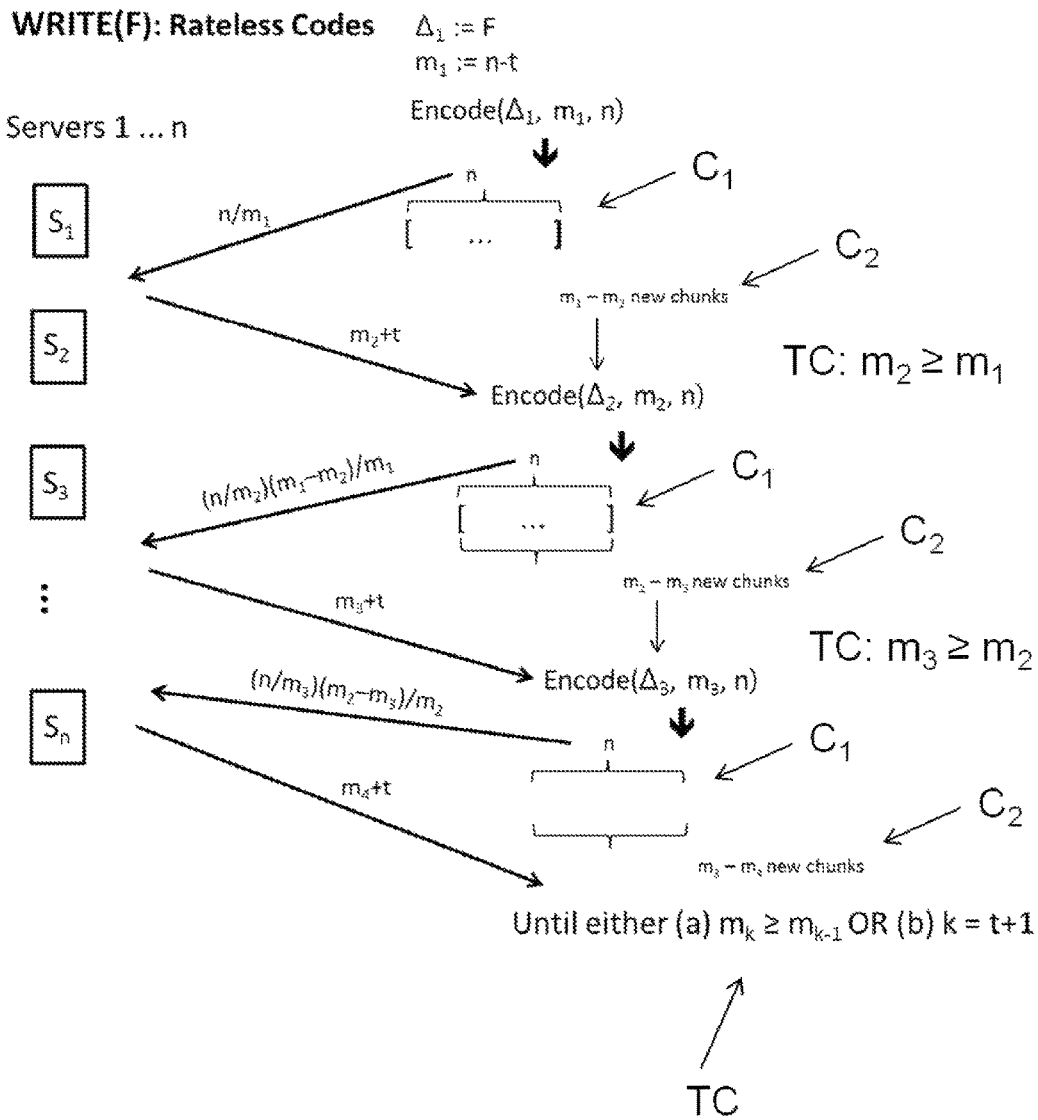

FIG. 2 shows a second embodiment of a method according to the present invention.

In FIG. 2 a storing method using rateless erasure codes is shown. The steps performed in FIG. 2 are similar to the steps in FIG. 1. However, instead of encoding the files $\Delta_k$ with reconstruction threshold $m_k$ with $n+\delta_k$ chunks $C_1, C_2$ prior to sending the first n chunks to the servers $S_1, S_2, S_3, \ldots, S_n$, the auxiliary chunks $C_2$ for generating the file $\Delta_k$ are generated after receiving the number of replies r from the servers $S_1, S_2, S_3, \ldots, S_n$, so that the auxiliary chunks $C_2$ for the file $\Delta_k$ are only generated to the extent that they are necessary. This is the main difference to the method shown in FIG. 1: In FIG. 1 in round k=1 the writer creates a set of auxiliary chunks $C_2$ for the case that there are less available servers $r_1$ than estimated denoted with r. If the estimate was correct, which is the common case, the resources spent to create these additional chunks $C_2$ are wasted since they are not used for storing.

In FIG. 2 these auxiliary chunks $C_2$ are created only if necessary: The additional chunks $C_2$ are generated by performing an encoding procedure with the file $\Delta_{k-1}$, the reconstruction threshold $m_{k-1}$ and the number of chunks to be created $m_{k-1}-m_k$. These $m_{k-1}-m_k$ created new chunks $C_2$ form then the file $\Delta_k$ for the next step. A further difference is, that this generated file $\Delta_k$ is then only encoded into n chunks corresponding to the number of servers. Therefore instead of performing an encoding procedure Encode($\Delta_k, m_k, n+\delta_k$) in each round k the encoding procedure according to FIG. 2 is to produce the chunks for sending them to the servers $S_1, S_2, \ldots, S_n$ as follows: Encode ($\Delta_k, m_k, n$). The resulting blow-up factor BF corresponds to the blow-up factor of FIG. 1 and amounts exactly $n/m_k$ in total.

In summary the present invention leverages synchrony in order to construct an asynchronous distributed storage protocol with an optimal communication blow-up factor. The present invention further recursively applies erasure coding on data parameters by a number of received replies as a reconstruction threshold.

Further the present invention minimizes the overhead with respect to information exchanged over the network in existing asynchronous distributed storage protocols. The present invention further applies to generic erasure coding schemes and is not particularly restricted to a specific type of erasure coding technique, in particular applies to both crash and byzantine models.

The present invention has inter alia the following advantages: The present invention provides an optimal blow-up factor with respect to the amount of information sent over a communication channel. The present invention may further be used in conjunction with both rateful and rateless codes. Even further the present invention applies in scenarios featuring crash-only servers, byzantine servers or a combination of crash-only and byzantine servers.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for storing a first file ($\Delta_1$) on a plurality of servers ($S_1, S_2, \ldots, S_n$), wherein the number of servers ($S_1, S_2, \ldots, S_n$) is n and the maximum number of servers ($S_1, S_2, \ldots, S_n$) which may fail is t, including a predefined number b of byzantine failures and a number t-b of crashes of the servers ($S_1, S_2, \ldots, S_n$), and wherein n equals 2t+b+1, the method comprising:
    a) Dividing the first file ($\Delta_1$) into a plurality of chunks ($C_1, C_2, \ldots, C_n$), wherein the number of chunks ($\delta_1$) is equal to or greater than the number of servers n,
    b) Sending n chunks of the first file ($\Delta_1$) to the n servers ($S_1, S_2, \ldots, S_n$), wherein one chunk is sent to each server ($S_1, S_2, \ldots, S_n$),
    c) Determining a number of replies r from the n servers ($S_1, S_2, \ldots, S_n$) indicating successful storage of the respective chunks,
    d) Checking if the number of replies r matches a terminating condition (TC),
    e) Generating, when the number of replies r does not match the terminating condition, a new file ($\Delta_2$) based on one or more chunks of the first file ($\Delta_1$), a reconstruction threshold ($m_1$) of the first file ($\Delta_1$) and the number of replies r, and
    f) Performing steps a)-e) with the new file ($\Delta_2$), until the terminating condition in step d) is fulfilled,
    wherein the terminating condition (TC) is based on the difference between the reconstruction thresholds of the new file ($\Delta_1, \Delta_2, \ldots, \Delta_k$) of step e) and the first file of step a) and the maximum number of servers t which may fail.

2. The method according to claim 1, wherein in step a) when the number of generated chunks ($C_1, C_2, \ldots, C_n$) is greater than the number of servers n, generating additional chunks, wherein the number of additional chunks is dependent on the number of servers (t) which may fail and a reconstruction threshold ($m_1, m_2, \ldots$) for the file ($\Delta_1$).

3. The method according to claim 1, wherein for the reconstruction threshold (m) is based on an estimated number of responsive servers ($S_1, S_2, \ldots, S_n$).

4. The method according to claim 3, wherein the estimated number is greater than a sum of byzantine servers b and servers t-b that may fail.

5. The method according to claim 2, wherein the total number of chunks in step a) is $$2t+th,$$

wherein t is the maximum number of servers that may fail and th is the reconstruction threshold for the file.

6. The method according to claim 1, wherein the one or more chunks for generation of the new file ($\Delta_2$) are solely-based on one or more of a prior non-sent remaining chunks.

7. The method according to claim 1, wherein the one or more chunks for generation of the new file ($\Delta_2$) are only generated when the termination condition (TC) is not matched.

8. The method according to claim 1, wherein the generation of the new file ($\Delta_2$) is performed by concatenating one or more chunks for generation of the new file.

9. The method according to claim 1, wherein a timeout threshold is used when determining the number of replies according to step c), wherein the timeout threshold starts after a predetermined number of received replies, and the predetermined number of replies is the number of replies needed for reconstruction of the file.

10. The method according to claim 9, wherein the timeout threshold is dynamically adapted in each round of steps a)-e), wherein the adaption is based on at least one of connection conditions between a writer of the file and the servers ($S_1, S_2, \ldots, S_n$) and server conditions.

11. The method according to claim 10, wherein adaption information is encoded in the replies from the servers ($S_1, S_2, \ldots, S_n$).

12. The method according to claim 1, wherein the termination condition (TC) is fulfilled when one of the reconstruction threshold ($m_2, m_3$) for a file (F, $\Delta_1$) of an actual round with regard to rounds of steps a)-e) is greater than or equal to the reconstruction threshold ($m_1, m_2, \ldots$) of the prior round and the number of rounds has exceeded the number of servers (t) that might be fail.

13. The method according to claim 1, wherein the new file ($\Delta_2$) is generated based on the one or more chunks ($C_1$) of a prior non-sent remaining chunks.

14. A system for storing a first file ($\Delta_1$) on a plurality of servers ($S_1, S_2, \ldots, S_n$), wherein the number of servers ($S_1, S_2, \ldots, S_n$) is n and the maximum number of servers ($S_1, S_2, \ldots, S_n$) which may fail is t, preferably including a predefined number b of byzantine failures and a number t-b of crashes of the servers ($S_1, S_2, \ldots, S_n$), and wherein n equals 2t+b+1, the system comprising one or more processors which, alone or in combination, are configured to provide for execution of the following steps:
    dividing the first file ($\Delta_1$) into a plurality of chunks ($C_1, C_2, \ldots, C_n$), wherein the number of chunks ($\delta_1$) is equal to or greater than the number of servers n,
    sending n chunks of the first file ($\Delta_1$) to the n servers ($S_1, S_2, \ldots, S_n$), wherein one chunk ($C_1, C_2$) is sent to each server ($S_1, S_2, \ldots, S_n$), determining a number of replies r from the n servers ($S_1$, $S_2$, ..., $S_n$) indicating successful storage of the respective chunks ($C_1$, $C_2$), checking whether the number of replies r matches a terminating condition (TC), generating a new file ($\Delta_2$, $\Delta_3$) based on one or more chunks ($C_1$, $C_2$) of the first file ($\Delta_1$), a reconstruction threshold ($m_1$, $m_2$, ...) of the first file and the number of replies r, and operating recursively the dividing, the sending, the determining, the checking and the generating steps with a new file ($\Delta_2$), until the terminating condition is fulfilled, wherein the terminating condition (TC) is based on the difference between the reconstruction thresholds of the new file ($\Delta_2$, ..., $\Delta_k$) and the first file and the maximum number of servers t which may fail.

* * * * *